United States Patent [19]

Rozman

[11] 4,358,973

[45] Nov. 16, 1982

[54] WORK CLAMPING FIXTURE

[75] Inventor: Dragoljub Rozman, Stuttgart, Fed. Rep. of Germany

[73] Assignee: Sandvik Kosta G.m.b.H., Renningen, Fed. Rep. of Germany

[21] Appl. No.: 54,698

[22] Filed: Jul. 5, 1979

[30] Foreign Application Priority Data

Jul. 12, 1978 [DE] Fed. Rep. of Germany ....... 2830550

[51] Int. Cl.³ ............................................. B23B 33/00
[52] U.S. Cl. .................................................... 82/40 R
[58] Field of Search ....................................... 82/40 R

[56] References Cited

U.S. PATENT DOCUMENTS

| | | | |
|---|---|---|---|
| 3,484,809 | 12/1969 | Swenson | 82/40 R |
| 3,605,533 | 9/1971 | Dugle | 82/40 R |
| 3,901,519 | 8/1975 | Lecailtec et al. | 82/40 R |

FOREIGN PATENT DOCUMENTS

| | | | |
|---|---|---|---|
| 1040879 | 10/1958 | Fed. Rep. of Germany | 82/40 R |
| 1119629 | 12/1961 | Fed. Rep. of Germany | 82/40 R |
| 678885 | 9/1952 | United Kingdom | |

*Primary Examiner*—Leonidas Vlachos

[57] ABSTRACT

The invention relates to a work clamping fixture for rotational machining which is equipped with an end face driver for torque transmission from a spindle of a machine tool to a workpiece, the end opposite the end face driver being supported by a center. The end face driver is provided with a plurality of driving pins which are arranged in a circle, and are hydraulically cushioned. Within the circle of driving pins there is mounted a spring-loaded and axially moveable face plate engaging the workpiece.

5 Claims, 4 Drawing Figures

WORK CLAMPING FIXTURE

BACKGROUND OF THE INVENTION

The present invention relates to a workpiece clamping fixture for rotational machining, having an end face driver for torque transmission from the spindle of a machine tool to the workpiece, the diameter thereof being larger than its length, and the end opposite the work clamping fixture being supported by a centre.

End face drivers of known design are commonly shaped as drive rings which are centrically clamped in a standard three-jaw chuck. They are provided on their circumference with three sharp-edged driving pieces against which the disk-type workpiece is pressed by the action of the opposite centre. Centrical location is achieved from the opposite centre while the driving pieces, the edges of which must be in a plane perpendicular to the axis of rotation, take care of the true position of the workpiece, and of torque transmission against the forces produced in the machining process. It is found to be of a disadvantage, however, that the end face of the workpiece cannot be premachined, because the three driving pieces leave an otherwise too deep an impression on the finished surface. Finishing must be done by a second clamping in a standard three-jaw chuck which method is relatively uneconomical.

It is normal practice that workpiece components of a length very much greater than their diameter, are clamped between two centres, and that at one end face a face driver is applied. Thereby a type of face driver has been introduced comprising a multitude of drive pins, all of which are braced against a common hydraulic cushion. This has the effect of exerting approximately the same pressure on practically all the driving pins, no matter what the true position is of the end face of the workpiece against which they are resting. Balancing is effected by the hydraulic cushion. However, any such hydraulic end face drivers cannot be used in the machining of components, where the diameter is equal, or even greater, than their length. In such cases the component might easily assume an oblique position with respect to its axis, because of the small distance between the two centres, thus executing a wobble in its rotational motion, and making it impossible to be normally machined.

It is the object of the present invention to have a workpiece clamping fixture of the aforementioned type so designed, that even hydraulic end face drivers can be used for the clamping of components, where the diameter might be equal, or even greater, than their length.

SUMMARY OF THE INVENTION

According to the present invention this problem is solved by the end face driver being provided, with a multitude of driving pins which are arranged in a circle, and are hydraulically supported, whereas within that circle of driving pins a spring-loaded and axially moveable face plate is mounted.

It is an advantage of the fixture according to the present invention that now even workpieces with a short length and with a large diameter can be clamped, using an end face driver which embodies hydraulically supported driving pins. Replacing one of the centres by a spring-loaded face plate, the true position of the component is reliably ensured, inspite of the driving pins being supported by a hydraulic cushion. Another advantage is that on account of the large number of driving pins even the finished end face opposite the driving pins can now be clamped, as the pins, owing to their multitude, require only a slight penetration in order to transmit the machining torque (as against the driving rings of the type known where always three knife edges only are provided, because of their rigid arrangement, and since only a three-point contact is statically determined). Providing a face plate, the advantages of a hydraulically balanced end face driver can thus be utilized also for components which have a diameter much greater than their relative length. In this way the outer cylindrical surfaces can be machined, as well as the end face adjacent to the centre. Also outer threads can be cut into the workpiece. The spring-loaded plate reliably prevents any wobbling motions. It is also of advantage that contrary to clamping the workpiece component in a jaw-type chuck, as is frequently done, material savings will now be possible on the workpieces to be machined. In addition, clamping is done very rapidly. There is finally another advantage in so far as the previously required second centre hole is no longer necessary. Further advantages are seen in the fact that the time-consuming turning-out of soft jaws for the second clamping is eliminated.

In a preferred embodiment of the invention the face plate is supported by cup springs, or by a helical spring, while it is coaxially guided in a central hole. Cup springs have the advantage of a very steep characteristic curve, and of very limited space requirements.

The face plate can be designed as a flat disk with a shaft at the rear, preferably with a hollow shaft. A preferred embodiment has, in addition, an outer rim projecting from the front side, and provided with radially arranged notches therein. The front side of this rim serves as locating surface for the rear end face of the component to be machined, i.e. for the end face of the workpiece opposite the centre.

Further details and embodiments of the invention will be found in the following description of an example of the design, as also represented in the drawing, in connection with the appended claims.

DESCRIPTION OF THE INVENTION

Figure 2:
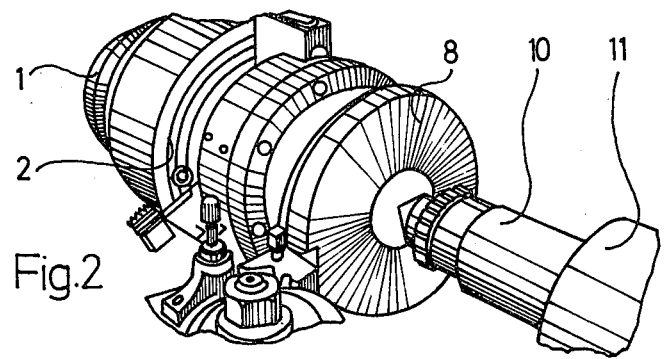
FIG. 2 is a similar view in the same direction as in FIG. 1, but with the workpiece clamped in position.
Figure 1:
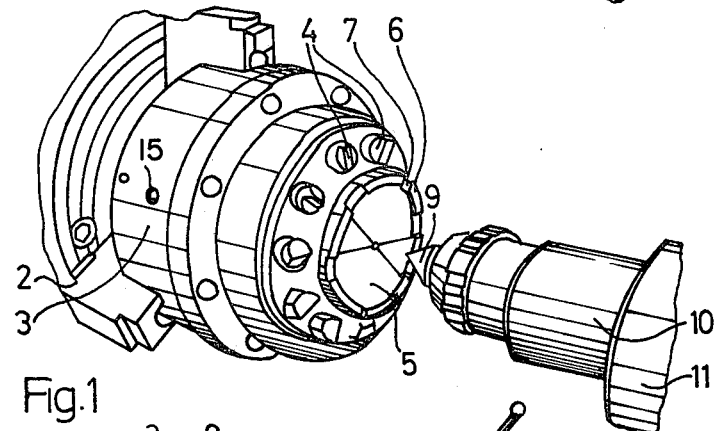
FIG. 1 is an oblique perspective view from the front of the work clamping fixture embodying the present invention, but without workpiece.

In a headstock 1 of a lathe a spindle with fitted-on three-jaw chuck 2 is mounted, the latter fixture holding an end face driver 3 with a number of driving pins 4 which are arranged on a circle and are axially moveable, in addition to being supported by a common hydraulic cushion in the interior of the end face driver 3. In the center of the end face driver is a face plate 5 formed of a disc end 12 having a central axial trunnion 13 extending from the rear face into the bore 11 and is slidably movable therein. The trunnion 13 is provided with a slot 14 on its outer surface into which a radially extending pin 15 extends, thereby permitting the end face to reciprocate within the limit of the slot. The end face 5 is biased by a spring 16 located axially behind it in the bore 11 and grounded at the rear end against a plug 17. In this manner, the plane face plate engaging the workpiece, is maintained perpendicular to the axis of rotation, avoiding the oblique positioning and wobbling motion found in the prior art. Face plate 5 has a flat front face with an axially projecting rim 6, into which a number of radially arranged notches 7 are cut. The front face of rim 6 serves as locating surface for a disk-shaped workpiece component 8, which is pressed against face plate 5 and against the driving pins 4 by the action of a revolving centre 9. The revolving centre 9 itself being mounted in a conventional manner in a sleeve 10 of a tailstock 11.

Figure 3:
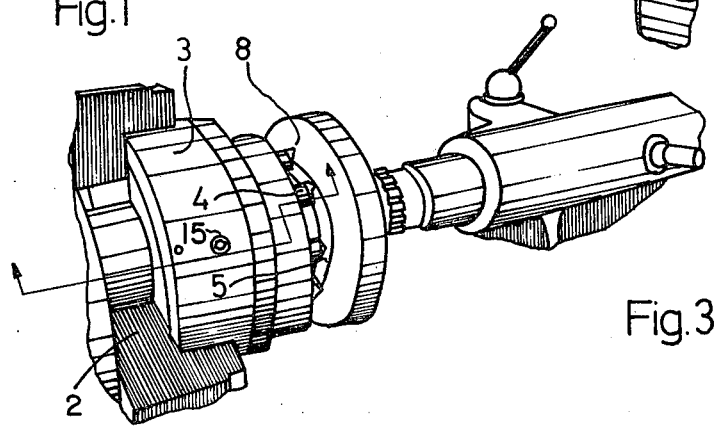
FIG. 3 shows the arrangement according to FIG. 2, in an oblique perspective view from the rear, that is at an angle of approximately 120° as against FIGS. 1 and 2, when shifted through a horizontal plane.
Figure 4:
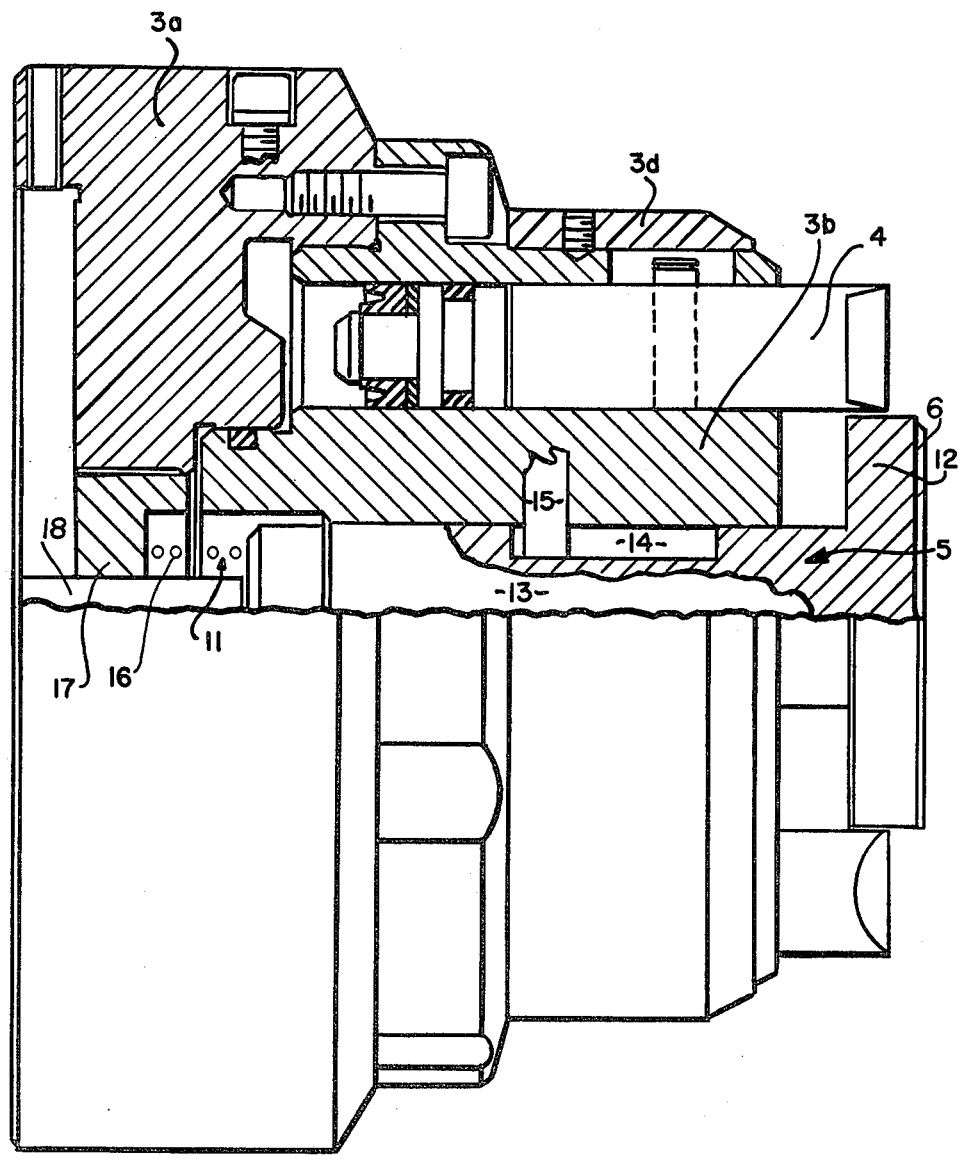
FIG. 4 is a partial sectional view through the end face driver taken along lines 44 of FIG. 3.

In the embodiment according to FIG. 3 the component 8 is not yet completely clamped, but is shown instead in the position in which face plate 5 can be further displaced axially in direction of the end face driver 3 by pushing forward of the sleeve 10, until the rear end of component 8 comes to rest against drive pins 4.

It is understood that the invention does not limit itself to the represented example of the embodiment, and that deviations are possible without departing from the scope of the invention. It is furthermore understood that the end face driver as shown can generally be fitted directly to the spindle of a lathe, without the intermediary of the represented jaw-type chuck 2, 3.

What is claimed as new and desired to be secured by Letters Patent is described in the following:

I claim:

1. An end face driver for the transmission of torque from a spindle to a workpiece in a rotary machine tool such as a lathe or the like, comprising a rotatable body having a plurality of pins arranged in an annular array extending axially from the front end thereof, said pins being axially movable relative to said body and to each other and resiliently biased by a common hydraulic cushion, a face plate mounted on said body within the annular array of pins for axial movement relative to said pins and body, and means independent of said hydraulic cushion, to resiliently bias said face plate axially outward from said body for engagement with said workpiece.

2. The driver according to claim 1 including means for mounting said face plate on said body so that the plane thereof is maintained substantially perpendicular to the axis of rotation of said body during operation.

3. The driver according to claim 2, wherein said face plate is provided with a central post received in a hole in said body and said means for biasing said face plate comprises helical springs interposed between said face plate and said body.

4. The driver according to claim 2, wherein said face plate is provided with a central post received in a hole in said body and said means for biasing said face plate comprises cup springs interposed between said face plate and said body.

5. The driver according to claim 2, 3 or 4, wherein said face plate is provided with an outer rim extending axially from the surface thereof toward said workpiece, said rim being provided with a plurality of radial notches.

* * * * *